United States Patent
Chapman

(10) Patent No.: US 9,304,324 B2
(45) Date of Patent: Apr. 5, 2016

(54) INVERTIBLE VERTICAL AXIS SHOCK AND VIBRATION ISOLATOR FOR A CAMERA

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 13/890,135

(22) Filed: May 8, 2013

(65) Prior Publication Data

US 2014/0334809 A1 Nov. 13, 2014

(51) Int. Cl.
| | |
|---|---|
| G02B 27/64 | (2006.01) |
| B66F 11/04 | (2006.01) |
| F16F 15/04 | (2006.01) |
| F16M 11/38 | (2006.01) |

(52) U.S. Cl.
CPC ............ *G02B 27/646* (2013.01); *B66F 11/048* (2013.01); *F16F 15/04* (2013.01); *F16M 11/38* (2013.01); *F16M 2200/048* (2013.01); *Y10T 29/49826* (2015.01)

(58) Field of Classification Search
CPC ............. F16F 15/08; F16F 15/02; F16F 7/00; F16F 5/00
USPC ......... 396/428, 419, 421, 55; 348/373, 208.7; 352/243; 248/164, 562, 564, 588, 636, 248/638; 74/473.29; 267/136, 140.11
See application file for complete search history.

(56) References Cited

U.S. PATENT DOCUMENTS

| | | | | |
|---|---|---|---|---|
| 4,764,075 A * | 8/1988 | Cox et al. | ....................... | 108/136 |
| 4,989,823 A | 2/1991 | Chapman | | |
| 6,513,769 B1 | 2/2003 | Chapamn | | |
| 6,550,740 B1 * | 4/2003 | Burer | ............................ | 248/564 |
| 7,037,006 B2 | 5/2006 | Chapman | | |
| 7,137,747 B2 | 11/2006 | Chapman | | |
| 8,077,212 B2 | 12/2011 | Chapman | | |
| 8,251,599 B2 | 8/2012 | Chapman | | |
| 2005/0232625 A1 * | 10/2005 | Chapman | ...................... | 396/428 |
| 2009/0283944 A1 | 11/2009 | Schordine | | |

FOREIGN PATENT DOCUMENTS

DE 2625508 A1 12/1977

OTHER PUBLICATIONS

European Patent Office, European Search Report issued in EP Patent Application No. 14165348.5 (Sep. 10, 2014).

* cited by examiner

*Primary Examiner* — Rochelle-Ann J Blackman
(74) *Attorney, Agent, or Firm* — Kenneth H. Ohriner; Perkins Coie LLP

(57) ABSTRACT

A vertical axis shock and vibration isolator for a camera has first and second plates connected by linkages which allow the plates to move towards and away from each other, while keeping the plates parallel to each other. The second plate is suspended from the first plate on dampener assemblies having a spring and a fluid dampener. The isolator may be used in an under slung or an over slung position, without changing its isolation characteristics. When set up in an over slung position, the dampener assemblies may be inverted separately from the isolator so that the springs remain loaded in compression.

11 Claims, 8 Drawing Sheets

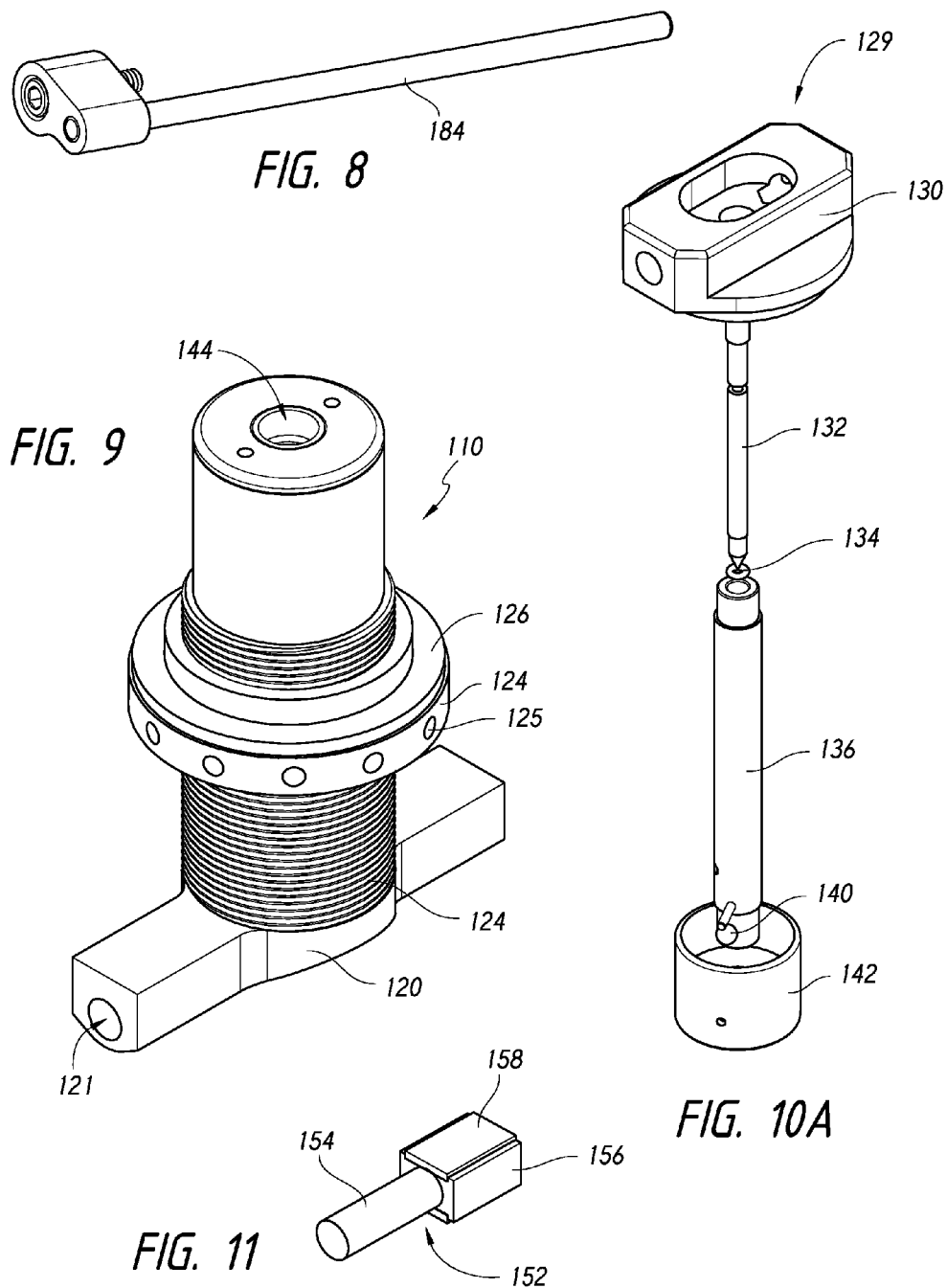

INVERTIBLE VERTICAL AXIS SHOCK AND VIBRATION ISOLATOR FOR A CAMERA

BACKGROUND OF INVENTION

During filming with a motion picture or video camera, it is often necessary for the camera to be moved over a floor or ground surface. This movement must be accomplished smoothly. Even small amounts of shock or vibration transmitted to the camera lens can result in shaky or erratic recorded images.

One technique for achieving smoother camera movement is to support the camera on a camera crane, which generally has a crane arm supported on a mobile base or vehicle. As the vehicle rolls over the floor or ground, cracks, bumps, depressions, etc. can generate shock and/or vibration impulses which may be transmitted through the structure of the camera crane to the camera lens. These impulses degrade steady filming ability. If the camera is positioned substantially above the floor surface, the effects of the impulses can be magnified at the camera position.

Adverse shock and vibration impulses may also occur via movement of the crane arm, even when the vehicle supporting the crane arm is stationary. For example, the angular acceleration or deceleration of the camera during quick panning movements can cause the crane arm to oscillate in a twisting movement, especially if the center of gravity of the camera payload is off set from the neutral axis of the crane arm. Similarly, with telescoping crane arms, abruptly starting or stopping inward or outward telescoping movement can cause oscillating vertical bending movement of the arm. The twisting and bending movements of the arm can disrupt steady filming or recording. These operating characteristics become more severe with lighter weight crane arms having less capacity to resist twisting and bending. Accordingly, there is a need for an improved design to allow for smooth filming sequences.

BRIEF DESCRIPTION OF THE DRAWINGS

In the drawings the same reference number indicates the same element in each of the views.

FIG. 8 is a perspective view of a block pin shown in FIGS. 4 and 5.

FIG. 9 is a perspective view of the dampener assemblies shown in FIGS. 4 and 5.

FIGS. 10A, 10B and 10C are perspectives view of an adjustable fluid dampener.

FIG. 11 is a perspective view of a slide block shown in FIG. 7.

DETAILED DESCRIPTION OF THE DRAWINGS

Figure 1:
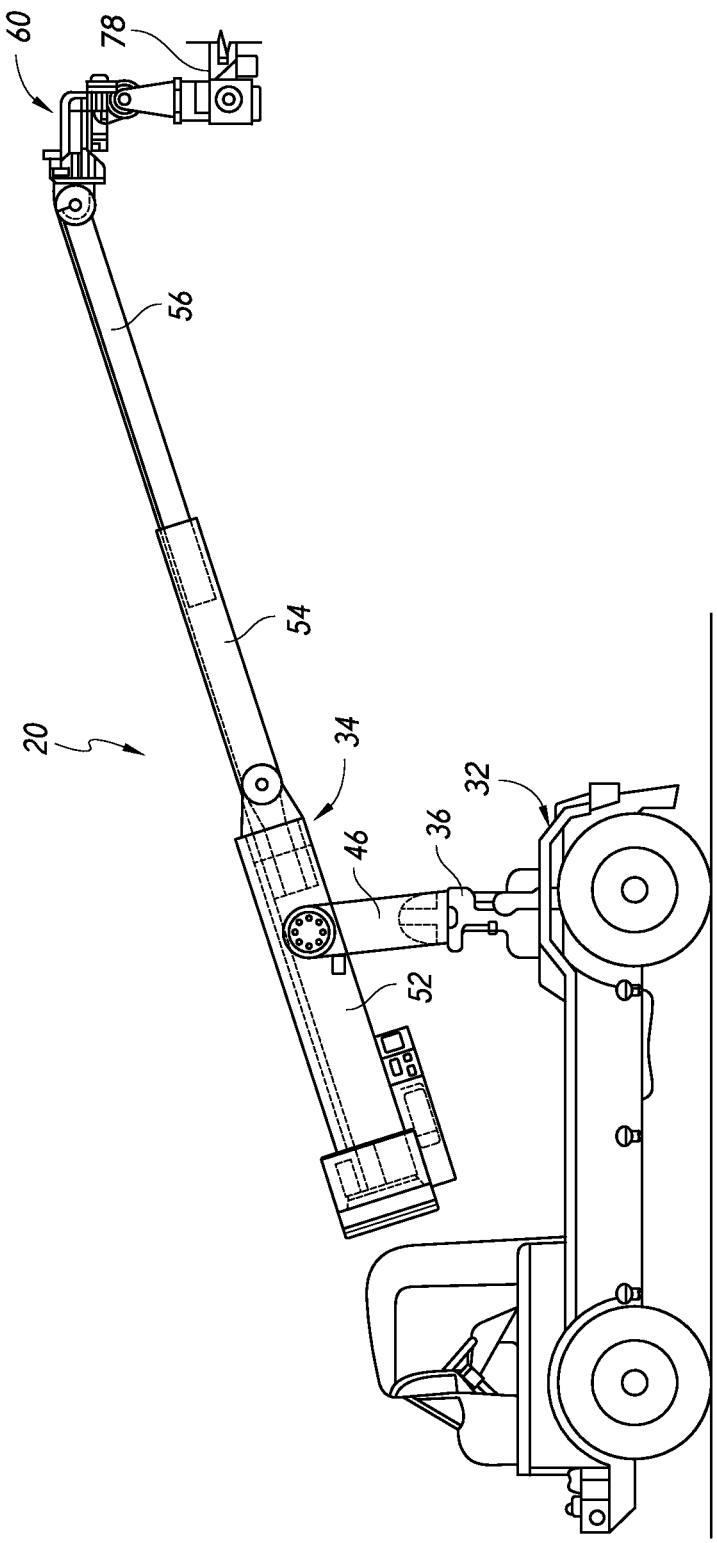
FIG. 1 is a side view of a camera crane having a telescoping crane arm pivotally attached onto a vehicle.

As shown in FIG. 1, a camera crane 20 may include a telescoping crane arm 34 supported on a U-frame 46 on a column 36 of a vehicle 32. The arm 34 in the example shown has a first fixed tube 52, and second and third telescoping tubes 54 and 56, with a nose assembly 60 attached onto the outer end of the third tube 56. Of course, other types of crane arms may be used as well, including non-telescoping or fixed length boom arms, or telescoping arms having one, three, four or more telescoping tubes.

Figure 2:
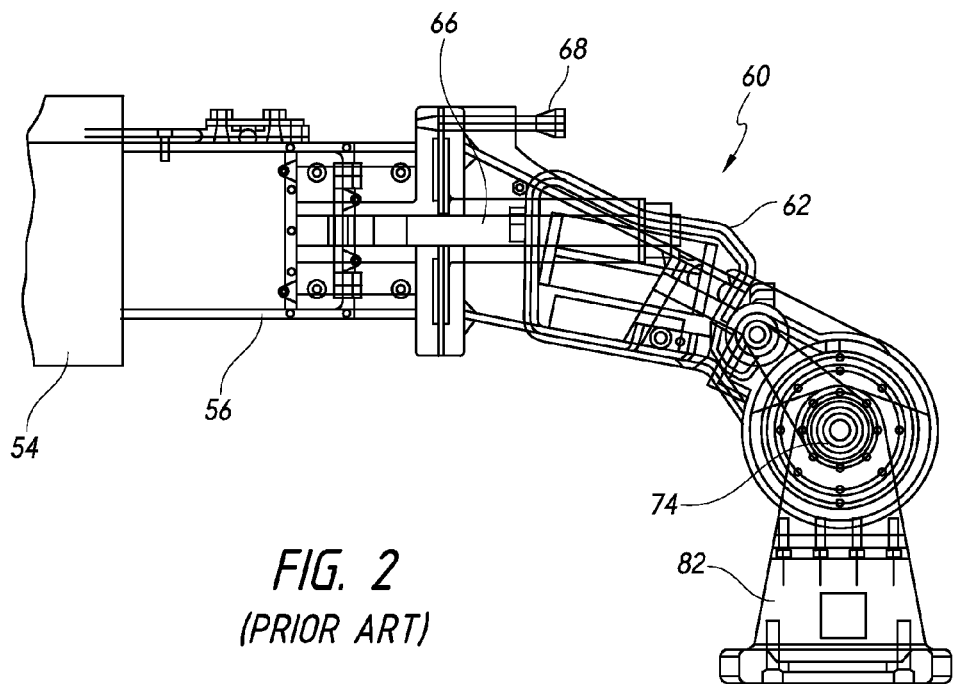
FIG. 2 is a side view of a camera crane nose assembly in an under slung position.
Figure 3:
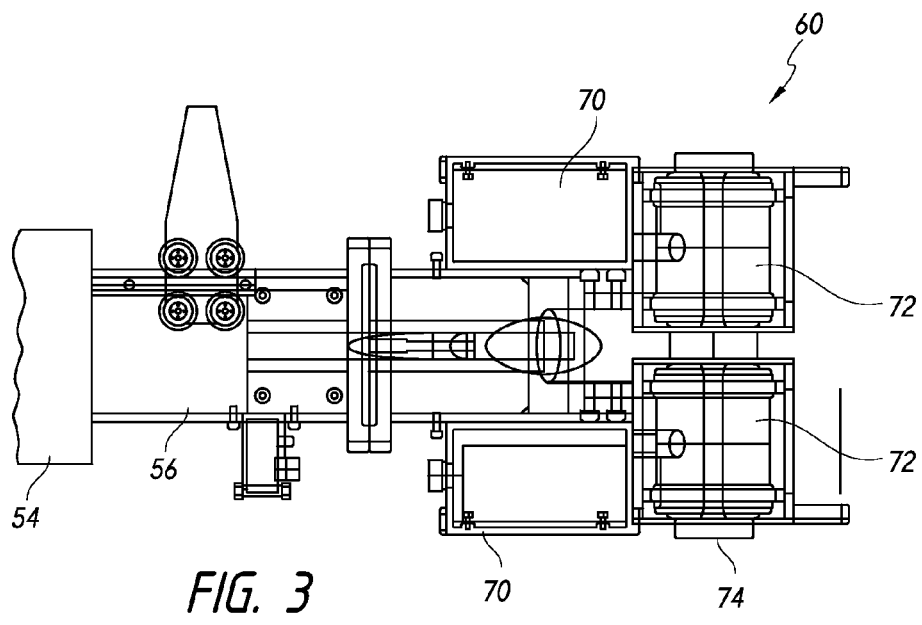
FIG. 3 is a plan view of the nose assembly shown in FIG. 2.
Figure 6:
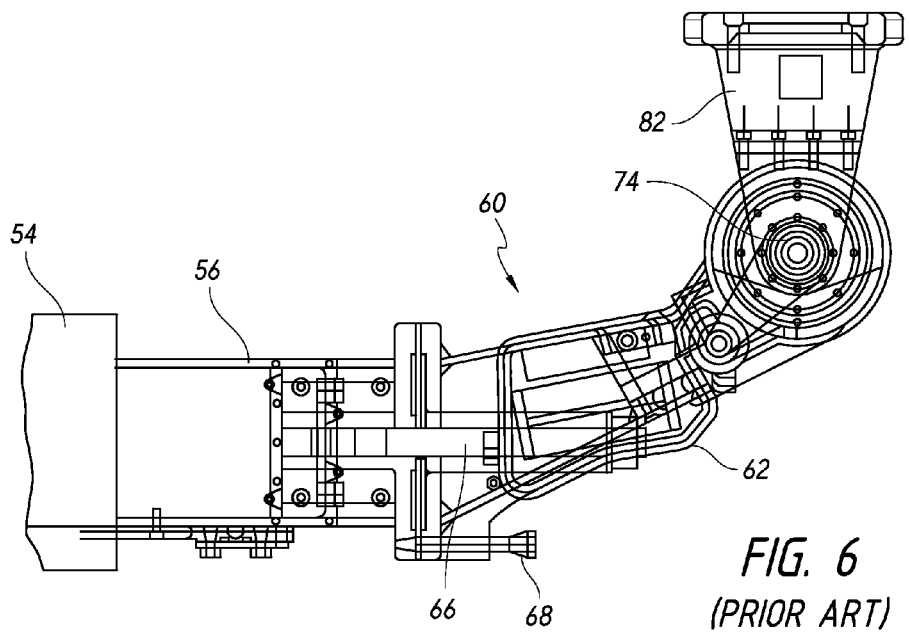
FIG. 6 is a side view of the nose assembly of FIG. 2 in an over slung position.

Turning to FIGS. 2, 3 and 6, the nose assembly 60 may be attached to the front end of the last tube, i.e., the third tube 56 in the design shown having three tubes. The nose assembly 60 may include a declined angle leg 62 which extends downwardly at an angle from the third tube 56. The leg 62 may be pivotally attached onto the end of the third tube 56 (about a roll axis) via a pivot axle 66. A quick release pin 68 may be used to secure the leg 62 into an under slung position (as shown in FIG. 2) or into an over slung position as shown in FIG. 6.

The nose assembly may have an automatic leveling system including electronic circuits and motors 72 within housings 70. When the camera head 78 moves out of level (due to extension/retraction movement of the crane arm 501, acceleration of the mobile base, change of elevation angle of the crane arm 34, or due to other factors, such as wind) the automatic leveling system detects the out of level condition and energizes the motors 72 which apply torque to the nose axle 74 to bring the camera head 78 back to a level position, as described in U.S. Pat. No. 8,251,599, incorporated herein by reference.

Figure 4:
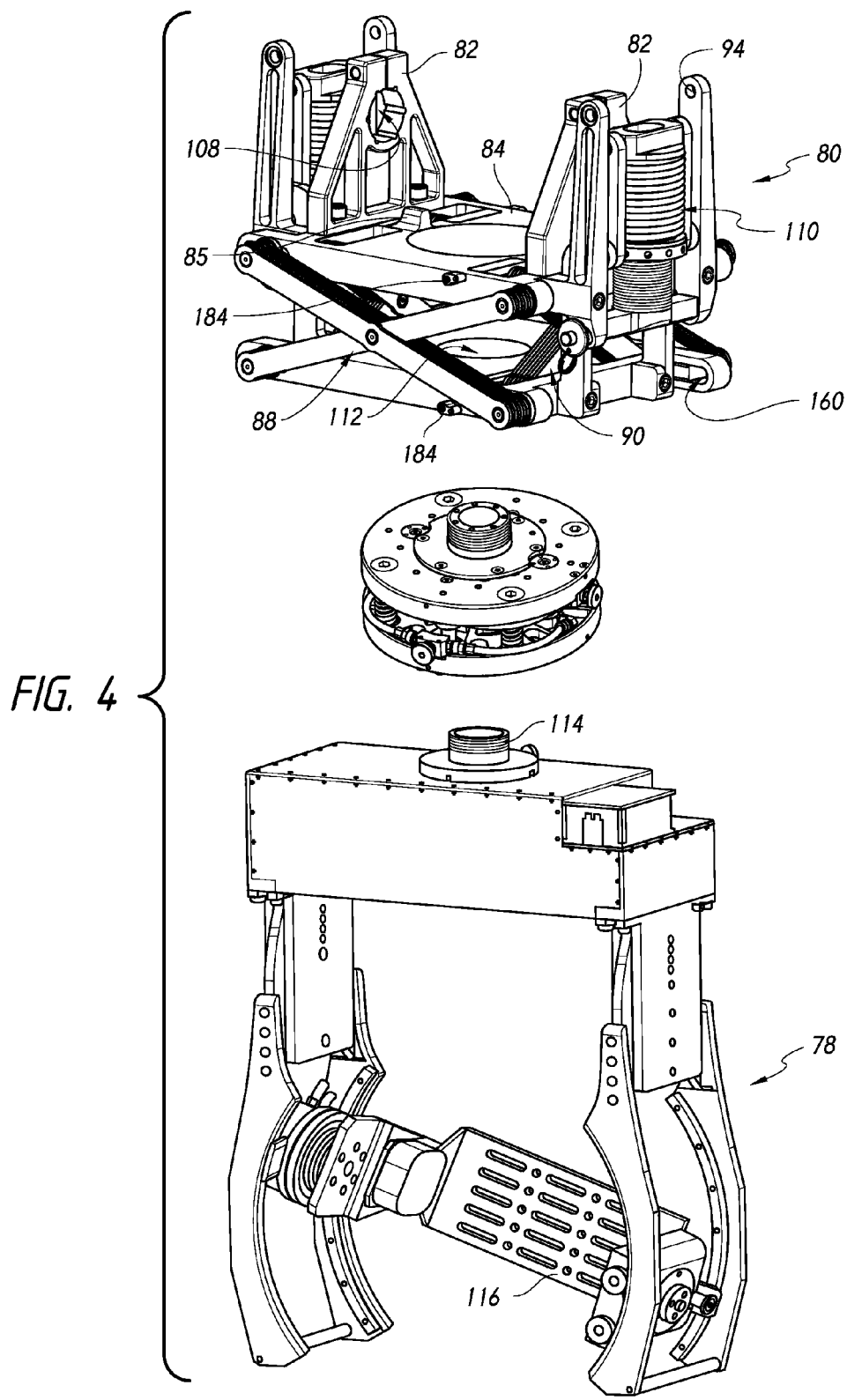
FIG. 4 is an exploded perspective view of a camera head attached to a vertical shock and vibration isolator, in an under slung position.

Turning to FIG. 4, a camera head 78, such as remote control gyro-stabilized camera head, may be attached to a vertical isolator 80 which in turn is attached to the nose assembly 60. Specifically, the nose axle 74 may be provided with end fittings engaged into axle openings 108 in axle frames 82 of the isolator 80. A threaded mounting tube 114 on the camera head 78 extends through a mounting hole 112 in a lower plate 86 of the isolator, with a ring nut securing the camera head 78 to the isolator 80, typically with the camera platform 116 centered relative to the isolator 80. Optionally a horizontal isolator 50, for example as described in U.S. patent application Ser. No. 13/855,485 may be attached between the vertical isolator 80 and the camera head 78, to better isolate the camera head 78 from both horizontal axis and vertical axis shock and vibration.

Figure 5:
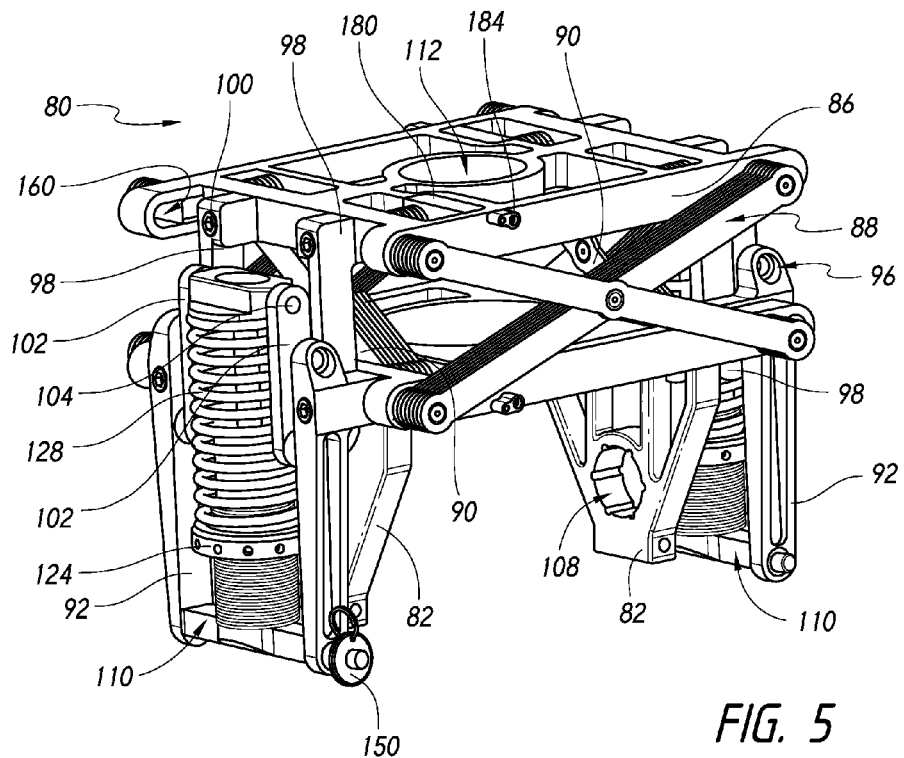
FIG. 5 is a perspective view of the isolator shown in FIG. 4 in an over slung position.
Figure 7:
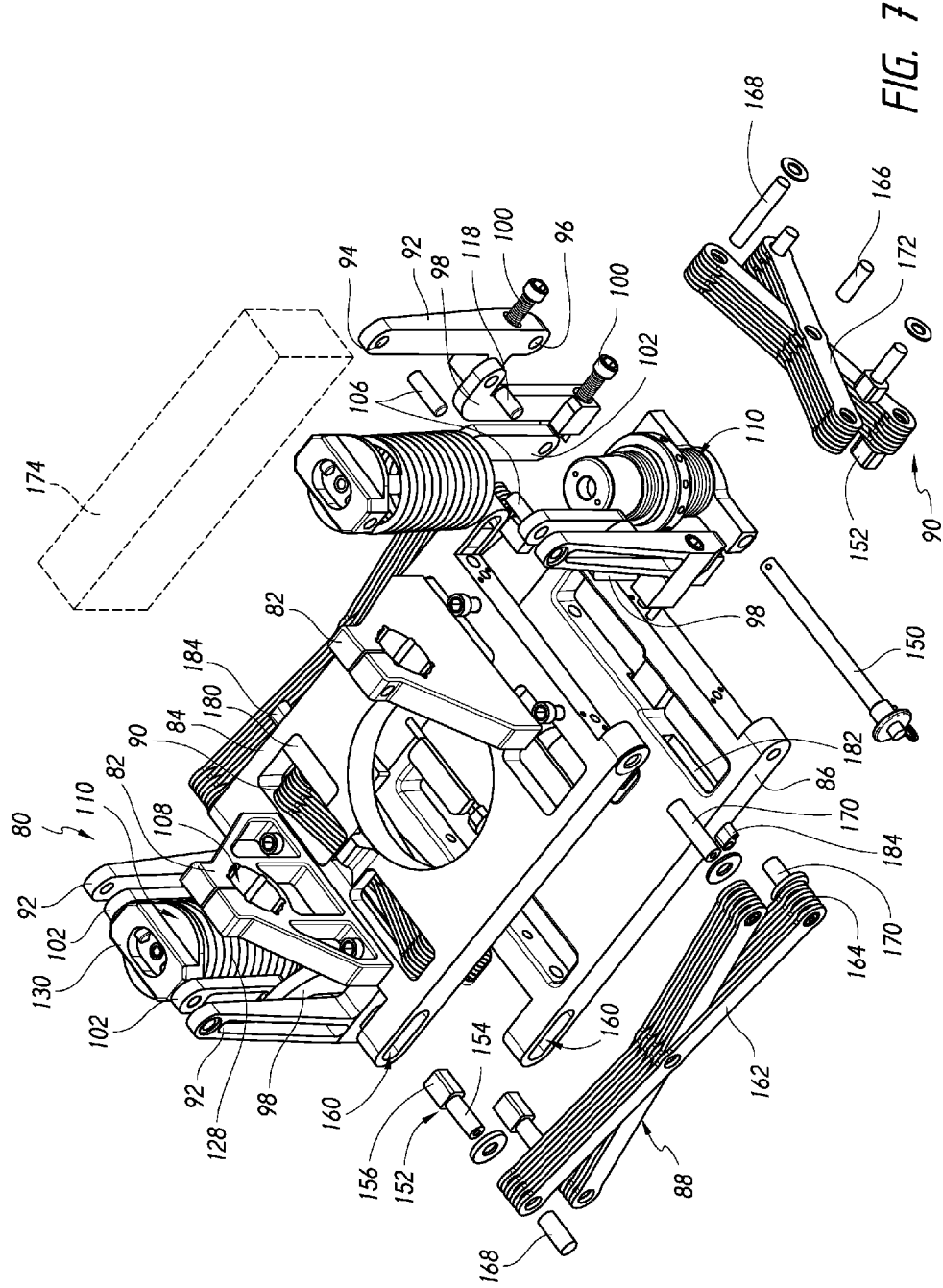
FIG. 7 is an exploded perspective view of the vertical isolator shown in FIGS. 4 and 5.

As shown in FIGS. 5 and 7, the axle frames 82 are attached onto a top plate 84 having a center through hole. The top plate 84 may be attached to a bottom plate 86 through front and back lateral X-bar assemblies 88 and through left and right side longitudinal X-bar assemblies 90. The X-bar assemblies 88 and 90 allow the top and bottom plates to move towards and away from each, while keeping the plates parallel to each other. Referring to FIG. 7, the lateral X-bar assemblies 88 may include a stack up of odd and even number lateral arms 162 pivotally attached together via a center pin or fastener 166. Fixed pins 170 extend through one end of the stack of odd and even arms 162 and into holes in the upper and lower plates. Slide pins 152 extend through the other end of each stack of odd and even arms 162 and are slidably positioned within slide slots 160 in the upper and lower plates 84 and 86.

Ring bushings or washers 164 may be provided between adjacent odd number arms, and between adjacent even number arms 162, to maintain spacing between them. Sleeve bushings 168, such as DU bushings (oil-less sliding bushings) may be provided between the pins 170 and 152 and the arms 162 to reduce frictional drag on pivoting movement of the lateral X-bar assemblies 88.

Referring still to FIG. 7, the longitudinal X-bar assemblies 90 may have the same design as the lateral X-bar assemblies 88, except that the longitudinal arms 172 are shorter than the lateral arms 162. Unlike the lateral X-bar assemblies 88 which are at the front and back edges of the plates 84 and 86, the longitudinal X-bar assemblies 90 are spaced inwardly between the axle frames 82. For ease of manufacture and assembly, separate longitudinal slide blocks 180 may be attached to the plates and held in place via block pins 184 shown in FIG. 8. The sliders 152 on the longitudinal X-bar assembly slide in longitudinal slots 182 in the slide blocks 180 attached to the plates, rather than in slots 160 in the plates themselves. The cover 174 provided over the lateral X-bar assemblies 90 is removed in the drawings for purpose of illustration.

Turning momentarily to FIG. 11, the sliders 152 may have a head 156 with flat surfaces covered with a low friction material 158, to allow the sliders to slide smoothly and quietly within the slots 160 or 182. The head 156 is joined to a pin 154 pivotally attached to the ends of the arms 162 and 172.

The vertical isolator 80 may be substantially symmetrical from left to right and from front to back. For purpose of explanation, the right side elements of the isolator are described, with the understanding that the left side elements are the same as the right side elements, or are mirror images of the right side elements. Referring to the elements on right side of FIG. 7, front and back end posts 92 are attached, e.g., via bolts 100 to the right side of the upper plate 84. Each end post 92 has an upper through hole 94 and a lower through hole 96. Front and back J-bars 98 are attached, e.g., via bolts 100 to the right side of the lower plate 86 and extend up between the end posts 92.

As also shown in FIG. 7, the upper ends of front and back invert links 102 are pivotally attached to a cap 130 at the top end of the dampener assembly 110 via upper pivot pins 106. The lower ends of the front and back invert links 102 are pivotally attached to the upper ends of the J-bars 98 via lower pivot pins 118.

Turning to FIG. 9, the dampener assembly 110 may have a T-frame 120 joined to a threaded housing 122. As shown in FIG. 7, a compression spring 128 is positioned between a low friction washer 126 on a top surface of a threaded tension ring 124, and a cap 130 attached to the top end of the housing 122. The tension ring 124 may be positioned vertically on the threaded housing 122 to adjust the compression of the spring 128, by turning the tension ring 124, optionally via a tool inserted into holes 125 in the tension ring 124.

Figure 10B:
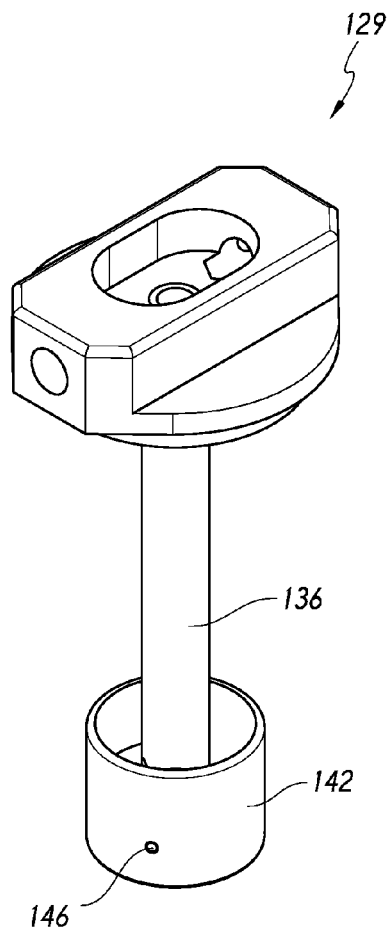
Figure 10C:
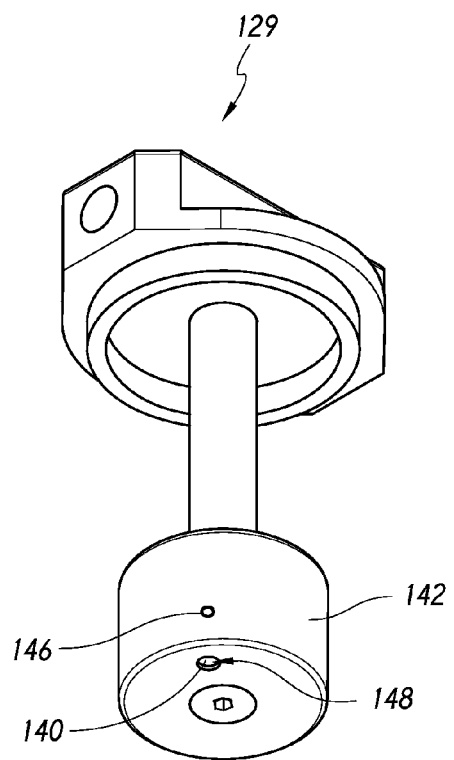

Referring to FIGS. 10A, 10B and 10C, a fluid dampener within the dampener assembly 110 may include a piston assembly 129 having a piston 142 movable within a cylinder 144 in the housing 122. The piston assembly 129 may include a valve pin 132 having an adjustable position relative to a valve seat 134 in a valve tube 136 attached to the piston 142. An internal bore in the valve tube 136 extends from the valve seat 134 through a lateral tube 138 to a side port 140 in the cylinder sidewall. A check ball 140 in a ball port 148 in the bottom end of the piston 142 allows substantially free fluid flow through the ball port 148 in the spring compression direction, and largely closes off the ball port 148 against fluid flow in the reverse or return direction, i.e. the direction of spring extension. The spring compression direction is the direction of the plates 84 and 86 moving apart.

The outer diameter of the piston 142 is slightly smaller than the inner diameter of the cylinder 144, e.g., 0.001-0.002 inches smaller. There is also no seal between the piston and the cylinder. The piston can move within the cylinder with little or no sliding friction. Dampening fluid in the cylinder can also flow through the annular gap between the piston and cylinder. In the spring compression direction, fluid in the cylinder moves past the piston in the annular gap, and also through the piston via the ball port 148. In the return direction, the check ball 140 closes off the ball port 148, allowing fluid to flow only through annular gap. Consequently, little dampening is provided in the spring compression direction, while substantial dampening is provided against movement in the return direction.

Referring back to FIG. 4, in use the isolator 80 may be attached to a camera crane 20 by attaching fittings on the nose axle 74 into the fitting openings 108 in the axle frames 82. This allows the isolator 80 to be used with the automatic leveling system of the nose assembly 60. Alternatively, the isolator 80 may be attached to a camera crane or other support via a mounting plate attached to the axle frames 82 or to the upper plate 84, if no axle frames 82 are used. Typically a camera head 78 is used, with the camera 48 (shown in FIG. 1) attached to the camera platform 116, and with the camera head 78 attached to the lower plate 86, as shown in FIG. 4, with or without an intervening horizontal isolator.

The dampening characteristics of the isolator 80 may be adjusted based on the weight of the camera head 78 and the camera payload, plus the weight of any horizontal isolator or other weight carried by the lower plate 86. The springs 128 may be adjusted by turning the tension ring 126 to lift the lower plate 86 (which carries the payload) to a neutral position where the plates are spaced apart by one-half of their maximum spacing. The fluid dampening may be adjusted by turning the valve pin 32, by inserting a tool into an opening in the cap 130. Turning the valve pin 32 adjusts the clearance between the valve seat 134 and the mating tip of the valve pin 32. For heavier payloads requiring greater fluid dampening, the valve pin is adjusted to provide a smaller clearance, while lighter payloads are set with greater clearance.

As the crane 20 moves during filming, the arm may move vertically, thereby also moving the upper plate 84. However, the vertical movement is largely isolated from the lower plate 86 and its payload, including the camera 48 on the camera platform 116. Specifically, the lower plate 84 and the payload largely remain in the same vertical position via inertia. As the upper plate 84 moves up or down with impulses of the crane arm, the X-bar linkages 88 and 90 allow the spacing between the plates to vary, while also keeping the plates parallel to each other. During downward movement of the upper plate, the sliders 152 slide outwardly as the plates move towards each other, with the sliders moving inwardly as the plates move away from each other during upward movement of the upper plate. The sliders 152 may optionally be replaced by rollers or other bearing element.

The automatic leveling system of the nose assembly 60, if used, drives the motors in the nose assembly which turn the nose axle 74. The nose axle 74 is attached to the isolator 80 via the axle frames 82, so that controlled turning of the nose axle 74 keeps the isolator level. A stop 85 as shown in FIG. 4 may be provided on the top plate 84 to limit the angle between the isolator 80 and the nose assembly 60.

Figure 12:
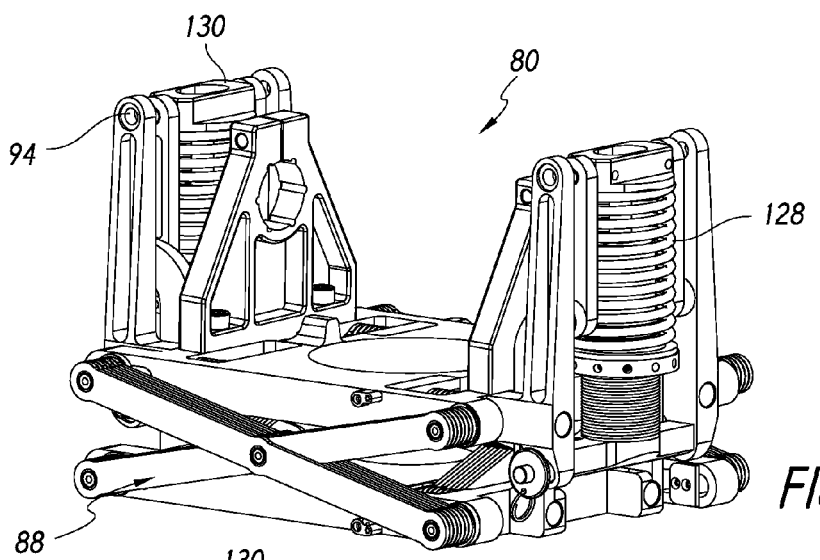
FIG. 12 is a perspective view of the isolator shown in FIGS. 4, 5 and 7 in a neutral position.

Referring to FIGS. 4 and 12, the payload is the camera 48 plus any accessories mounted with the camera on the camera platform 116, the camera head 78, and any horizontal axis isolator used. The suspended components of the vertical isolator are those components not rigidly attached to the nose assembly 60, primarily the lower plate 86 and the X-bar assemblies. The payload weight is the weight of the camera 48, the head 78, and the horizontal isolator 50 if used. The combined weight of the payload and the suspended components is referred to as the suspended weight. The springs 128 are loaded in compression by the suspended weight. The suspended weight is transferred to the springs via the J-bars 98, invert links 102 and caps 130.

Figure 14:
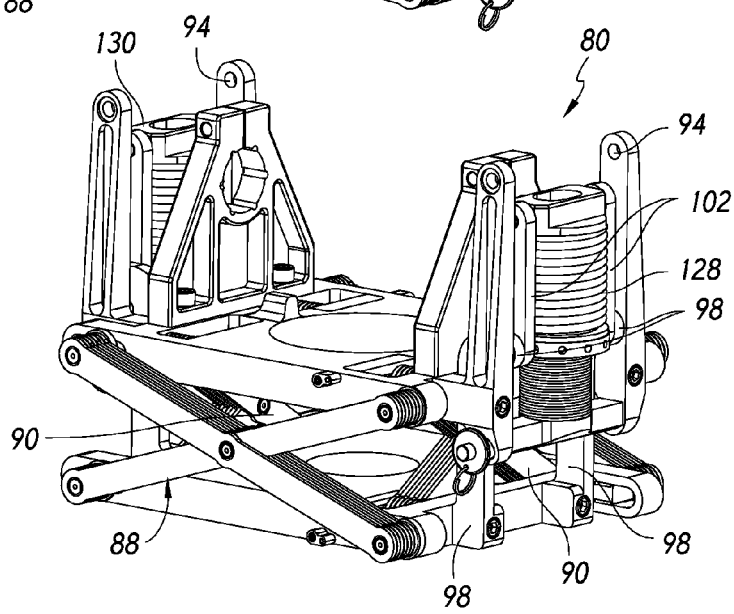
FIG. 14 is a perspective view of the isolator of FIG. 12 with the springs in a fully compressed position.

Referring to FIG. 14, during an upward shock impulse, the un-suspended section of the isolator which is essentially rigidly attached to the crane arm (primarily axle frames 82, the upper plate 84, and the end posts 92) moves up with the crane arm. The springs 128 compress further momentarily as the plates move apart. The fluid dampener 129 provides only nominal dampening during this movement as the ball port 140 is open. After the shock impulse passes, the springs extend and return the isolator from the position shown in FIG. 14 back to the neutral position shown in FIG. 12. During this movement the ball 140 closes off the ball port 148, so that the fluid dampener 129 dampens this return movement to reduce or avoid extensive overshoot and oscillation.

Figure 13:
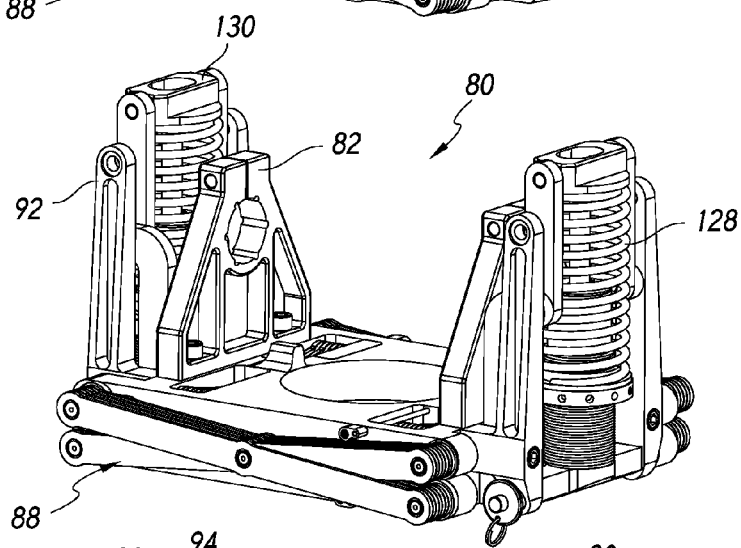
FIG. 13 is a perspective view of the isolator of FIG. 12 with the springs in a fully extended position.

With reference to FIG. 13, during a downward shock impulse, the un-suspended section of the isolator (primarily axle frames 82, the upper plate 84, and the end posts 92) move down. The load on the springs 128 is momentarily reduced and the springs expand. This movement is dampened by fluid dampener 129 since upward or outward movement of the piston in the cylinder causes the check ball 140 to seat into the ball port 148. After the shock impulse passes, the weight of the payload and suspended components on the springs returns the isolator from the position shown in FIG. 13 back to the neutral position shown in FIG. 12. In contrast to the return movement from an upward shock impulse, with the downward shock impulse the fluid dampener 129 provides only nominal dampening. However, with a downward shock impulse, the return movement occurs under gravitational force, and not spring force, so that providing dampening to avoid overshoot and oscillation is less significant.

FIGS. 4 and 12-14 shown the isolator used in an under slung position. For use in the under slung position the dampener assemblies 110 are in the upright position, with the T-frame 120 aligned with the bottom holes 96 of the end posts 92, and with the quick release pins 150 extending through the T-frame holes 121, to lock the dampener assemblies 110 in place. Since the springs 128 act in compression, the isolator 80 cannot be simply inverted for use in the over slung position. Rather, the springs must remain in the upright position, regardless of whether the isolator is upright for under slung use, or upside down for over slung use.

To switch the isolator over from the under slung to the over slung position, with the isolator unloaded, the quick release pins 150 are released and removed. The T-frames 120 are pulled outwardly and rotated up, while the caps 130 simultaneously rotate down on the invert links 102. The hole 121 in each T-frame is aligned with the upper holes 94 in the end posts 92 and the quick release pins 150 are reinstalled. The isolator 80 is then upside down, but the dampener assemblies 110 and the springs 128 remain upright. The isolator 80 then operates in the over slung position in the same way that it operates in the under slung position.

Although X-bar linkages are shown, other types of linkages may be used to attach the upper and lower plates, for example linear linkages. The isolator may also be designed with only lateral or only longitudinal X-bar or other linkages.

Thus, a novel isolator has been shown and described. Various changes and substitutions may of course be made without departing from the spirit and scope of the invention. The invention, therefore, should not be limited except by the following claims and their equivalents.

The invention claimed is:

1. A shock and vibration isolator for a camera, comprising:
   a first plate;
   a second plate parallel to the first plate;
   a level linkage including first and second crossed lateral arms pivotally attached to each other, and pivotally attached to the first plate and to the second plate, for allowing the plates to move towards and away from each other, while keeping the plates parallel to each other;
   a dampener assembly having a spring and a dampener;
   a first link having a first end pivotally attached to a first side of a first end of the dampener assembly and a second end pivotally attached to the second plate;
   a second link having a first end pivotally attached to a second side of the first end of the dampener assembly and a second end pivotally attached to the second plate;
   with the dampener assembly rotatable relative to the first and second links from an upright position, wherein the first plate is above the second plate and the spring is loaded in compression when first and second plates move towards each other, to an inverted position, wherein the first plate is below the second plate and the spring is loaded in compression when the first and second plates move towards each other.

2. The isolator of claim 1 with the level linkage further comprising first and second crossed longitudinal arms pivotally attached to each other, and pivotally attached to the first plate and to the second plate.

3. The isolator of claim 1 further comprising at least one pair of end posts on the first plate, with each end post having a first end and a second end, and with the dampener assembly having a second end pivotally attachable to either the first end or to the second end of the end posts.

4. The isolator of claim 1 wherein the second ends of the of the first and second links are pivotally attached to the second plate via first and second bars each having a first end rigidly attached to the second plate and with the second end of the first link pivotally attached to a second end of the first bar, and with the second end of the second link pivotally attached to a second end of the second bar.

5. The isolator of claim 1 further comprising a tension ring on dampener assembly for adjusting tension in the spring, and an adjustable valve on the dampener for adjusting dampening provided by the dampener.

6. The isolator of claim 1 with the dampener providing a first level of dampening against movement in a first direction, and a second level of dampening against movement in a second direction opposite to the first direction, and with the first level of dampening greater than the second level of dampening.

7. A vertical axis isolator for a camera, comprising:
   an upper plate;
   a lower plate;
   lateral and longitudinal linkages attached to the upper and lower plates;
   first and second pairs of spaced apart end posts on the upper plate, with each end post having an upper end and a lower end;
   first and second pairs of bars rigidly attached to the lower plate;
   a first dampener assembly between the first pair of spaced apart end posts and between the first pair of bars;

a second dampener assembly between the second pair of spaced apart end posts and between the second pairs of bars, with each of the first and second dampener assemblies including a spring and a dampener;

a first pair of links pivotally attached to an upper end of the first dampener assembly and to the first pair of bars;

a second pair of links pivotally attached to an upper end of the second dampener assembly and to the second pair of bars;

with the first dampener assembly having a lower end attachable to the upper end or to the lower end of the first pair of end posts;

with the second dampener assembly having a lower end attachable to the upper end or to the lower end of the second pair of end posts; and the first and second dampener assemblies movable on the first and second pairs of links, respectively, into upright and inverted positions.

8. The isolator of claim 7 with the lower end of the first dampener assembly including a frame, and with the lower end of the first dampener assembly attachable to the upper end or to the lower end of the first pair of posts via a pin extending through a hole in the frame and through holes in the upper and lower ends of the end posts.

9. The isolator of claim 7 with an upper end of the first dampener assembly secured to the first pair of spaced apart end posts by a first release pin, and with an upper end of the second dampener assembly secured to the second pair of spaced apart end posts via a second release pin.

10. A method for using a vertical axis camera isolator, comprising:

attaching a first plate of a camera isolator to a camera crane, with the camera isolator in an under slung position;

supporting a camera on a fixture attached to a second plate;

connecting the first plate to the second plate with two or more dampener assemblies in an upright position;

allowing the first and second plates to move towards and away from each other with the plates remaining parallel to absorb a shock impulse;

attaching the first plate to the camera crane in an over slung position by inverting the isolator; and pivoting the dampener assemblies through one half turn to maintain the dampener assemblies in an upright position.

11. An isolator for a camera, comprising:

an first plate;

a second plate;

a level linkage including crossed arms pivotally attached to the first plate and to the second plate, for allowing the plates to move towards and away from each other, while keeping the plates substantially parallel to each other;

first and second pairs of spaced apart end posts rigidly attached to the upper plate, with each end post having an upper end and a lower end;

a first dampener assembly between the first pair of spaced apart end posts;

a second dampener assembly between the second pair of spaced apart end posts, with each of the first and second dampener assemblies including a spring and a dampener;

a first pair of links pivotally attached to an upper end of the first dampener assembly and to a first pair of bars rigidly attached to the lower plate;

a second pair of links pivotally attached to an upper end of the second dampener assembly and to a second pair of bars rigidly attached to the lower plate;

with the first dampener assembly having a lower end attachable to the upper end or to the lower end of the first pair of end posts;

with the second dampener assembly having a lower end attachable to the upper end or to the lower end of the second pair of end posts; and the first and second dampener assemblies movable on the first and second pairs of links, respectively, into upright and inverted positions.

* * * * *